US011928517B2

(12) United States Patent
Chen et al.

(10) Patent No.: US 11,928,517 B2
(45) Date of Patent: Mar. 12, 2024

(54) FEATURE RESOURCE SELF-TUNING AND REBALANCING

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 17/370,300

(22) Filed: Jul. 8, 2021

(65) Prior Publication Data

US 2023/0012021 A1   Jan. 12, 2023

(51) Int. Cl.
*G06F 9/50*   (2006.01)
*H04L 67/1097*   (2022.01)

(52) U.S. Cl.
CPC .......... *G06F 9/505* (2013.01); *H04L 67/1097* (2013.01); *G06F 2209/501* (2013.01)

(58) Field of Classification Search
CPC . G06F 9/505; G06F 2209/501; H04L 67/1097
See application file for complete search history.

(56) References Cited

U.S. PATENT DOCUMENTS

| | | | | |
|---|---|---|---|---|
| 7,464,097 B2* | 12/2008 | Goetz | ................... | H04L 41/024 |
| 7,747,625 B2* | 6/2010 | Gargi | ..................... | G06F 16/54 |
| | | | | 707/739 |
| 7,900,206 B1* | 3/2011 | Joshi | .................... | G06F 11/2035 |
| | | | | 714/48 |
| 8,645,425 B1* | 2/2014 | Brown | ................... | G06F 16/217 |
| | | | | 707/788 |
| 9,047,481 B2* | 6/2015 | Ripberger | .......... | G06F 16/24573 |
| 9,465,630 B1* | 10/2016 | Muniz | .................. | G06F 9/45558 |
| 9,929,926 B1* | 3/2018 | Streete | .................... | H04L 43/20 |
| 10,255,148 B2* | 4/2019 | Vogel | .................. | H04L 43/0805 |

(Continued)

FOREIGN PATENT DOCUMENTS

| | | | | |
|---|---|---|---|---|
| CN | 109992400 A | * | 7/2019 | |
| CN | 110032429 A | * | 7/2019 | ............. G06F 1/329 |

(Continued)

*Primary Examiner* — Shean Tokuta
(74) *Attorney, Agent, or Firm* — Krishnendu Gupta; Lesley Leonessa

(57) ABSTRACT

An apparatus comprises at least one processing device that includes a processor coupled to a memory. The processing device is configured to identify a plurality of resource objects associated with a processing device, to group correlated resource objects according to processing device utilization of the resource objects, to assign a first weight to a first resource object grouping, wherein the first weight is associated with a performance impact of the first resource object grouping on the processing device, and to release at least some of the first resource object grouping to provide additional resources to a second resource object grouping, the additional resources resulting from the releasing, wherein the first object grouping is selected for the releasing based on a comparison between the first weight and a second weight associated with the second resource object grouping, wherein the releasing is performed to improve performance of the processing device.

20 Claims, 8 Drawing Sheets

(56) References Cited

U.S. PATENT DOCUMENTS

| | | | | |
|---|---|---|---|---|
| 10,476,742 | B1* | 11/2019 | Szarvas | H04L 41/5054 |
| 11,494,518 | B1* | 11/2022 | Curtis | G06F 21/629 |
| 2005/0021952 | A1* | 1/2005 | Haugh | G06F 21/6227 |
| | | | | 713/166 |
| 2008/0306950 | A1* | 12/2008 | Richards | G06F 9/505 |
| 2012/0150858 | A1* | 6/2012 | Ripberger | G06F 3/067 |
| | | | | 707/E17.089 |
| 2018/0349146 | A1* | 12/2018 | Iwamoto | G06F 9/461 |
| 2021/0141816 | A1* | 5/2021 | Whelan | G06F 40/205 |
| 2023/0012021 | A1* | 1/2023 | Chen | G06F 9/505 |

FOREIGN PATENT DOCUMENTS

| | | | | |
|---|---|---|---|---|
| CN | 110032439 A | * | 7/2019 | |
| CN | 114035941 A | * | 2/2022 | |
| WO | WO-2019128540 A1 | * | 7/2019 | G06F 9/50 |
| WO | WO-2019137170 A1 | * | 7/2019 | G06F 1/32 |

* cited by examiner

FEATURE RESOURCE SELF-TUNING AND REBALANCING

FIELD

The field relates generally to information processing systems, and more particularly to usage of allocating resources in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (IO) operations from one or more host devices and in processing those IO operations runs various storage application processes that generally involve interaction of that storage node with one or more other ones of the storage nodes.

SUMMARY

Illustrative embodiments provide techniques for implementing a self-tuning resource allocating system in a distributed storage system. For example, illustrative embodiments identify a plurality of resource objects associated with a processing device. A self-tuning resource allocating system groups correlated resource objects according to processing device utilization of the resource objects, and assigns a first weight to a first resource object grouping. The first weight is associated with a performance impact of the first resource object grouping on the processing device. The self-tuning resource allocating system releases at least some of the first resource object grouping to provide additional resources to a second resource object grouping, where the additional resources result from the releasing. The first object grouping is selected for the releasing based on a comparison between the first weight and a second weight associated with the second resource object grouping, where the releasing is performed to improve performance of the processing device. The self-tuning resource allocating system executes on at least one processing device comprising a processor coupled to a memory. A processing device can comprise at least one processing core of a multi-core storage node of a distributed storage system. Other types of processing devices can be used in other embodiments.

These and other illustrative embodiments include, without limitation, apparatus, systems, methods and processor-readable storage media.

DETAILED DESCRIPTION

Figure 1:
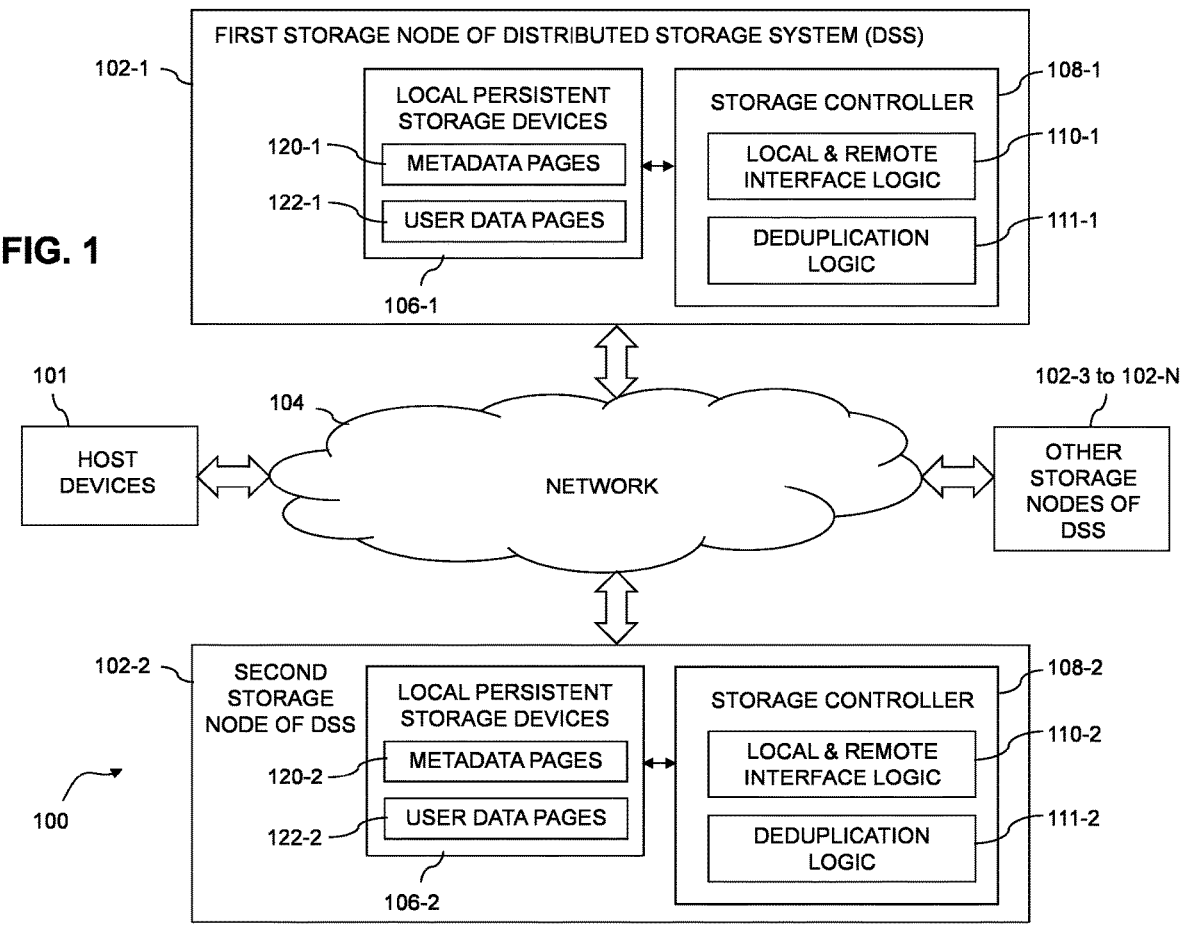
FIG. 1 is a block diagram of an information processing system comprising a distributed storage system incorporating functionality for a self-tuning resource allocating system in an illustrative embodiment.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Described below is a technique for use in implementing a self-tuning resource allocating system in a distributed storage system, which technique may be used to provide, among other things, identifying a plurality of resource objects associated with a processing device, grouping correlated resource objects according to processing device utilization of the resource objects, assigning a first weight to a first resource object grouping, where the first weight is associated with a performance impact of the first resource object grouping on the processing device, releasing at least some of the first resource object grouping to provide additional resources to a second resource object grouping, the additional resources resulting from the releasing, where the first object grouping is selected for the releasing based on a comparison between the first weight and a second weight associated with the second resource object grouping, where the releasing is performed to improve performance of the processing device, where the method is performed by a self-tuning resource allocating system executing on at least one processing device comprising a processor coupled to a memory.

In a storage system, resources are reserved so that storage system operations have enough resources to complete efficiently. For example, during synchronous replication, I/O requests are sent from a host to a storage array, and the I/O request is also sent to the replication destination. Only when both the storage array and the replication destination persist the data, a message is sent to the host side that the I/O request is complete. The synchronous replication process adds a latency factor to each I/O request from the host. To minimize this additional latency, resources critical to synchronous replication are reserved to ensure that the replication process does not have to wait for any resources. Additionally, for every resource that is reserved for the host I/O request, the same resources need to be reserved for the replication I/O request. Typically, these resources are pre-allocated to ensure that all customers using the synchronous replication feature have enough resources to process these replications efficiently. Typically, resource allocation is static. For example, the most critical resources are pre-allocated before the storage system is shipped to the customer. These critical resources might include the number of objects, size of the memory pool, number of open connections, amount of Central Processing Unit (CPU) cycles, amount of memory, number of network connections, etc. To ensure efficient replication, these resources are often allocated based on worst case scenarios to prevent starvation at run time. However, some customers might not use synchronous replication. Some customers might only utilize asynchronous replication. This means that the resource reserved for synchronous replication are not necessary for these customers. This may lead to overprovisioning and lower resource utilization in customers' actual usage.

Conventional approaches to resource allocation can be problematic. One problem with resource allocation, as described above, is overprovisioning of resources that will not necessarily be used at the customer site. Another problem is having critical resource provisions tailored to how the customers actually use the storage systems. Another problem is dynamically adjusting the resource provisioning as the customers' workloads change.

Conventional technologies do not provide a way to dynamically allocate resources based on actual system usage and real time system usage. Conventional technologies do not provide a way to dynamically learn real system usage and dynamically adjust resource allocation based on that information. Conventional technologies do not provide a way to dynamically release resources for storage system features that are not enabled, or not in use. Conventional technologies do not provide a machine learning system that learns customer resource usage based on customers' use of features and workload, analyze the metrics, and dynamically adjust resource allocation based on data collected.

By contrast, in at least some implementations in accordance with the current technique as described herein, a self-tuning resource allocating system in a storage system identifies a plurality of resource objects associated with a processing device. The self-tuning resource allocating system groups correlated resource objects according to processing device utilization of the resource objects, and assigns a first weight to a first resource object grouping. The first weight is associated with a performance impact of the first resource object grouping on the processing device. The self-tuning resource allocating system releases at least some of the first resource object grouping to provide additional resources to a second resource object grouping, where the additional resources result from the releasing. The first object grouping is selected for the releasing based on a comparison between the first weight and a second weight associated with the second resource object grouping, where the releasing is performed to improve performance of the processing device. The self-tuning resource allocating system executes on at least one processing device comprising a processor coupled to a memory.

Thus, a goal of the current technique is to provide a method and a system for providing a self-tuning resource allocating system. Another goal is to provide a machine learning system that dynamically learns customers' usage of resource and features of the storage system, and load balances resources according to customer usage by releasing under utilized resources. Another goal is to dynamically pre-allocate resources according to customer usage of those resources. Yet another goal is to avoid over provisioning of resources and features not used.

In at least some implementations in accordance with the current technique described herein, the use of a self-tuning resource allocating system can provide one or more of the following advantages: identifying low utilization and/or low impact resources in system performance, reducing resource allocation associated with low utilization resources to free up a global pool of resources to be available for other components or applications, allowing critical resources to request additional resource allocation from the global pool to improve performance, continuously improving the prediction of the impact of updated resource allocation and utilization, and continuously adjusting resources until the storage system reaches a desired performance with lowest resource allocation and/or highest resource utilization, etc.

In contrast to conventional technologies, in at least some implementations in accordance with the current technique as described herein, a self-tuning resource allocating system in a distributed storage system identifies a plurality of resource objects associated with a processing device. The self-tuning resource allocating system groups correlated resource objects according to processing device utilization of the resource objects, and assigns a first weight to a first resource object grouping. The first weight is associated with a performance impact of the first resource object grouping on the processing device. The self-tuning resource allocating system releases at least some of the first resource object grouping to provide additional resources to a second resource object grouping, where the additional resources result from the releasing. The first object grouping is selected for the releasing based on a comparison between the first weight and a second weight associated with the second resource object grouping, where the releasing is performed to improve performance of the processing device. The self-tuning resource allocating system executes on at least one processing device comprising a processor coupled to a memory. A processing device can comprise at least one processing core of a multi-core storage node of a distributed storage system.

In an example embodiment of the current technique, the self-tuning resource allocating system tunes the performance of the processing device at runtime by iteratively grouping, assigning, and releasing to achieve a preferred performance of the processing device based on at least one of a workload and configuration of the processing device.

In an example embodiment of the current technique, the self-tuning resource allocating system provides a template for pre-allocating resources on a second processing device based on the tuning performed for the processing device.

In an example embodiment of the current technique, the self-tuning resource allocating system obtains a plurality of pre-allocation templates from a plurality of processing devices, and tailors a pre-allocation template for a third processing device based on commonalities among the plurality of pre-allocation templates.

In an example embodiment of the current technique, the self-tuning resource allocating system adjusts at least one weight to align a predicted performance of the processing device with an actual performance.

In an example embodiment of the current technique, the self-tuning resource allocating system updates pre-allocated resources to improve the performance of the processing device, where the pre-allocated resources were pre-allocated based on a presumed performance, and where the pre-allocated resources are updated based on an actual performance associated with the processing device.

In an example embodiment of the current technique, the self-tuning resource allocating system identifies each of the plurality of resource objects using a unique identifier.

In an example embodiment of the current technique, the self-tuning resource allocating system tags each of the plurality of resource objects with the unique identifier.

In an example embodiment of the current technique, the self-tuning resource allocating system analyzes code associated with operations that execute on the processing device to determine which of the resource objects associated with the process device are correlated.

In an example embodiment of the current technique, the self-tuning resource allocating system determines similar resource utilization statistics during a sampling period to determine which of the resource objects associated with the processing device are correlated.

In an example embodiment of the current technique, the self-tuning resource allocating system calculates a weight for the first resource object grouping using a linear regression function and utilization statistics associated with the first resource object group associated with a sampling period.

In an example embodiment of the current technique, the self-tuning resource allocating system assigns a random weight to the first resource object grouping prior to calculating the weight for the first resource object grouping.

In an example embodiment of the current technique, the self-tuning resource allocating system assigns a weight for each resource object group for at least one performance metric associated with the performance of the processing device.

In an example embodiment of the current technique, the self-tuning resource allocating system assigns a weight associated with a workload on the processing device and a performance criterion associated with the processing device.

In an example embodiment of the current technique, the self-tuning resource allocating system determines the performance of the processing devices is less than a preferred performance of the processing device, and in response, releases at least some of the first resource object grouping to improve the performance of the processing device to more closely align with the preferred performance of the processing device.

In an example embodiment of the current technique, the self-tuning resource allocating system sorts a plurality of resource object grouping weights to identify resource object groups with lower weights as candidates for the releasing.

In an example embodiment of the current technique, at least one processing device comprises at least one processing core of a multi-core storage node of a distributed storage system.

In an example embodiment of the current technique, at least one processing device is associated with a distributed content addressable storage (CAS) system.

In an example embodiment of the current technique, the self-tuning resource allocating system is a machine learning system.

FIG. 1 shows an information processing system 100 configured in accordance with an illustrative embodiment. The information processing system 100 comprises a plurality of host devices 101, a first storage node 102-1, a second storage node 102-2, and a plurality of additional storage nodes 102-3 through 102-N, all of which are configured to communicate with one another over a network 104. The first and second storage nodes 102 with the additional storage nodes 102-3 through 102-N collectively form an example of what is more generally referred to herein as a "distributed storage system" or DSS. Other distributed storage systems can include different numbers and arrangements of storage nodes. For example, a distributed storage system in some embodiments may include only the first and second storage nodes 102.

Each of the storage nodes 102 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 102. The term "input-output" as used herein refers to at least one of input and output. For example, IO operations may comprise write requests and/or read requests directed to logical addresses of a particular logical storage volume of a given one of the storage nodes 102. These and other types of IO operations are also generally referred to herein as IO requests.

The IO operations that are being concurrently processed in the system in some embodiments are referred to herein as "in-flight" IOs that have been admitted by the storage nodes 102 to further processing within the system 100. The storage nodes 102 are illustratively configured to queue IO operations arriving from one or more of the host devices 101 in one or more sets of IO queues.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The host devices 101 are illustratively configured to write data to and read data from the distributed storage system comprising storage nodes 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 102-1 comprises a plurality of storage devices 106-1 and an associated storage controller 108-1. The storage devices 106-1 store metadata pages 120-1 and user data pages 122-1 associated with one or more storage volumes of the distributed storage system. The storage volumes illustratively comprise respective logical units (LUNs) or other types of logical storage volumes. The storage devices 106-1 more particularly comprise local persistent storage devices of the first storage node 102-1. Such persistent storage devices are local to the first storage node 102-1, but remote from the second storage node 102-2 and the other storage nodes 102.

Similarly, the second storage node 102-2 comprises a plurality of storage devices 106-2 and an associated storage controller 108-2. The storage devices 106-2 store metadata pages 120-2 and user data pages 122-2 associated with one or more storage volumes of the distributed storage system, such as the above-noted LUNs. The storage devices 106-2 more particularly comprise local persistent storage devices of the second storage node 102-2. Such persistent storage devices are local to the second storage node 102-2, but remote from the first storage node 102-1 and the other storage nodes 102.

The storage controller 108-1 of first storage node 102-1 in the FIG. 1 embodiment includes local and remote interface logic 110-1 and deduplication logic 111-1. It can also include additional elements, such as journal destaging logic and other logic instances for processing IO operations, and a signature generator for generating content-based signatures of respective data pages.

Similarly, the storage controller 108-2 of second storage node 102-2 includes local and remote interface logic 110-2 and deduplication logic 111-2. The storage controller 108-2, like the storage controller 108-1, can also include additional elements, such as journal destaging logic and other logic instances for processing IO operations, and a signature generator for generating content-based signatures of respective data pages.

The instances of local and remote interface logic 110-1 and 110-2 are collectively referred to herein as local and remote interface logic 110. Such local and remote interface logic instances are also referred to herein as individually or collectively comprising distributed logic instances of the system 100.

The local and remote interface logic 110 of the storage nodes 102 controls interaction of the storage nodes 102 with local and remote storage devices 106 of the distributed storage system. The local persistent storage of a given one of the storage nodes 102 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 102 via remote interfaces. The local and remote interface logic 110 illustratively controls the manner in which the local and remote interfaces are used to access persistent storage of the given node, as will be described in more detail elsewhere herein.

For example, it is assumed in some embodiments each of the storage devices 106 on a given one of the storage nodes 102 can be accessed by the given storage node via its local interface, or by any of the other storage nodes via a remote direct memory access (RDMA) interface. A given storage application executing on the storage nodes 102 illustratively requires that all of the storage nodes 102 be able to access all of the storage devices 106. Such access to local persistent storage of each node from the other storage nodes can be performed, for example, using the RDMA interfaces with the other storage nodes, although other arrangements are possible.

The instances of deduplication logic 111-1 and 111-2 are collectively referred to herein as deduplication logic 111. Such deduplication logic instances are also referred to herein as individually or collectively comprising distributed logic instances of the system 100. The instances of deduplication logic 111 perform deduplication functionality in the distributed storage system, as is described in more detail elsewhere herein.

The storage controllers 108 are illustratively configured to control performance of at least a portion of a process as described herein for a self-tuning resource allocating system using local and remote interface logic 110 of storage nodes 102. For example, the storage controllers 108 and their respective instances of local and remote interface logic 110 illustratively implement at least portions of the self-tuning resource allocating system to be described below in conjunction with FIG. 4. This process is an example of an algorithm implemented by logic instances deployed within the storage controllers 108.

Each of the other storage nodes 102 of the distributed storage system of FIG. 1 is assumed to be configured in a manner similar to that described above for the first storage node 102-1 and the second storage node 102-2.

The storage controllers 108 of the storage nodes 102 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 102 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 102 of the distributed storage system of FIG. 1.

In some embodiments, the storage nodes 102 of the distributed storage system collectively provide a scale-out all-flash content addressable storage array such as an XtremIO™ storage array from Dell Technologies. The storage nodes 102 can be used to implement other types of storage systems in other embodiments. One or more such storage nodes can be associated with at least one storage array, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

In some embodiments, the storage nodes 102 of the distributed storage system of FIG. 1 are connected to each other in a full mesh network, and are collectively managed by a system manager. A given set of local persistent storage devices 106 on a given one of the storage nodes 102 is illustratively implemented in a disk array enclosure (DAE) or other type of storage array enclosure of that storage node. In some embodiments, different ones of the storage nodes 102 are associated with the same DAE or other type of storage array enclosure. The system manager is illustratively implemented as a management module or other similar management logic instance, possibly running on one or more of the storage nodes 102, on another storage node and/or on a separate non-storage node of the distributed storage system.

The distributed storage system of FIG. 1 implements functionality for a self-tuning resource allocating system in the storage nodes 102, utilizing instances of local and remote interface logic 110 of the storage controllers 108 of respective ones of the storage nodes 102, as will now be described in more detail.

As indicated previously, the storage nodes 102 of the distributed storage system of FIG. 1 process IO operations from one or more host devices 101 and in processing those IO operations run various storage application processes that generally involve interaction of that storage node with one or more other ones of the storage nodes.

In operation, the distributed storage system comprising storage nodes 102 works in conjunction with a self-tuning resource allocating system in the following exemplary manner.

At least one processing device of the distributed storage system comprises a processor and a memory coupled to the processor. A self-tuning resource allocating system in a distributed storage system identifies a plurality of resource objects associated with a processing device. The self-tuning resource allocating system groups correlated resource objects according to processing device utilization of the resource objects, and assigns a first weight to a first resource object grouping. The first weight is associated with a performance impact of the first resource object grouping on the processing device. The self-tuning resource allocating system releases at least some of the first resource object grouping to provide additional resources to a second resource object grouping, where the additional resources result from the releasing. The first object grouping is selected for the releasing based on a comparison between the first weight and a second weight associated with the second resource object grouping, where the releasing is performed to improve performance of the processing device. The self-tuning resource allocating system executes on at least one processing device comprising a processor coupled to a memory. A processing device of the distributed storage system may comprise the self-tuning resource allocating system. A processing device, separate from the distributed storage system, comprising a processor and a memory coupled to the processor, may comprise the self-tuning resource allocating system. The self-tuning resource allocating system may be a standalone plugin that a customer may choose to include within a processing device. Thus, a "self-tuning resource allocating system" as that term is used herein comprises an entity executing on at least one processing device comprising a processor coupled to a memory.

The "at least one processing device" referred to above illustratively comprises at least a portion of one or more of the storage nodes 102, and can include, for example, a single processing device on one of the storage nodes 102, multiple processing devices on one of the storage nodes 102, or one or more processing devices on each of one or more of the storage nodes 102, with each such processing device comprising at least one processor and at least one memory. For example, at least one processing device can comprise at least one management module of the distributed storage system. Such a management module may also interact with other modules, such as routing modules, control modules and data modules, as described in more detail elsewhere herein.

An example of a system manager will be described below in conjunction with FIG. 5. The system manager can be implemented in one of the storage nodes 102, or can be distributed as multiple system management components across multiple ones of the storage nodes 102, or can be implemented in an entirely separate management node of the distributed storage system.

In some embodiments, associating the first storage node with at least the second storage node comprises pairing the first storage node with the second storage node. For example, the first and second storage nodes are illustrative paired by being part of the same "brick" or node pair sharing the storage devices of a given DAE. Other types of pairing or association arrangements can be used.

Some embodiments disclosed herein are configured to utilize one or more RAID arrangements to store data across a plurality of storage devices in each of one or more of the storage nodes 102 of the distributed storage system.

In some embodiments, each of at least a subset of the storage nodes 102 of the distributed storage system comprises a set of processing modules configured to communicate with corresponding sets of processing modules on other ones of the storage nodes 102. A given such set of processing modules illustratively comprises at least a routing module, a control module and a data module, with the sets of processing modules of the storage nodes of the distributed storage system collectively comprising at least a portion of a distributed storage controller of the distributed storage system. One or more of the storage nodes 102 illustratively comprises a management module, which may be viewed as an example of what is more generally referred to herein as a "system manager." Examples of such sets of processing modules are described in more detail below in conjunction with FIGS. 2 and 3. A given such "system manager" as that term is used herein comprises an entity executing on at least one processing device comprising a processor coupled to a memory.

It is assumed in some embodiments that each of the storage nodes 102 incorporates substantially the same self-tuning resource allocating system using its corresponding instance of the local and remote interface logic 110.

Such self-tuning resource allocating system functionality in the distributed storage system of FIG. 1 is illustratively implemented at least in part by or under the control of the instances of local and remote interface logic 110 in the storage controllers 108 of the respective first and second storage nodes 102. The other storage nodes 102 of the distributed storage system of FIG. 1 are assumed to operate in a manner similar to that described above for the first and second storage nodes 102.

These and other features of illustrative embodiments disclosed herein are examples only, and should not be construed as limiting in any way. Other types of self-tuning resource allocating systems may be used in other embodiments, and the term "self-tuning resource allocating system" as used herein is intended to be broadly construed.

An additional example of an illustrative process for implementing at least some of the above-described self-tuning resource allocating system functionality will be provided below in conjunction with the flow diagram of FIG. 4.

The storage nodes 102 collectively comprise an example of a distributed storage system. The term "distributed storage system" as used herein is intended to be broadly construed, so as to encompass, for example, clustered storage systems or other types of storage systems distributed over multiple storage nodes.

The storage nodes 102 in some embodiments are part of a distributed content addressable storage system in which logical addresses of data pages are mapped to physical addresses of the data pages in the storage devices 106 using respective content-based signatures that are generated from those data pages, as will now be described in more detail with reference to the illustrative embodiments of FIGS. 2 and 3.

Figure 2:
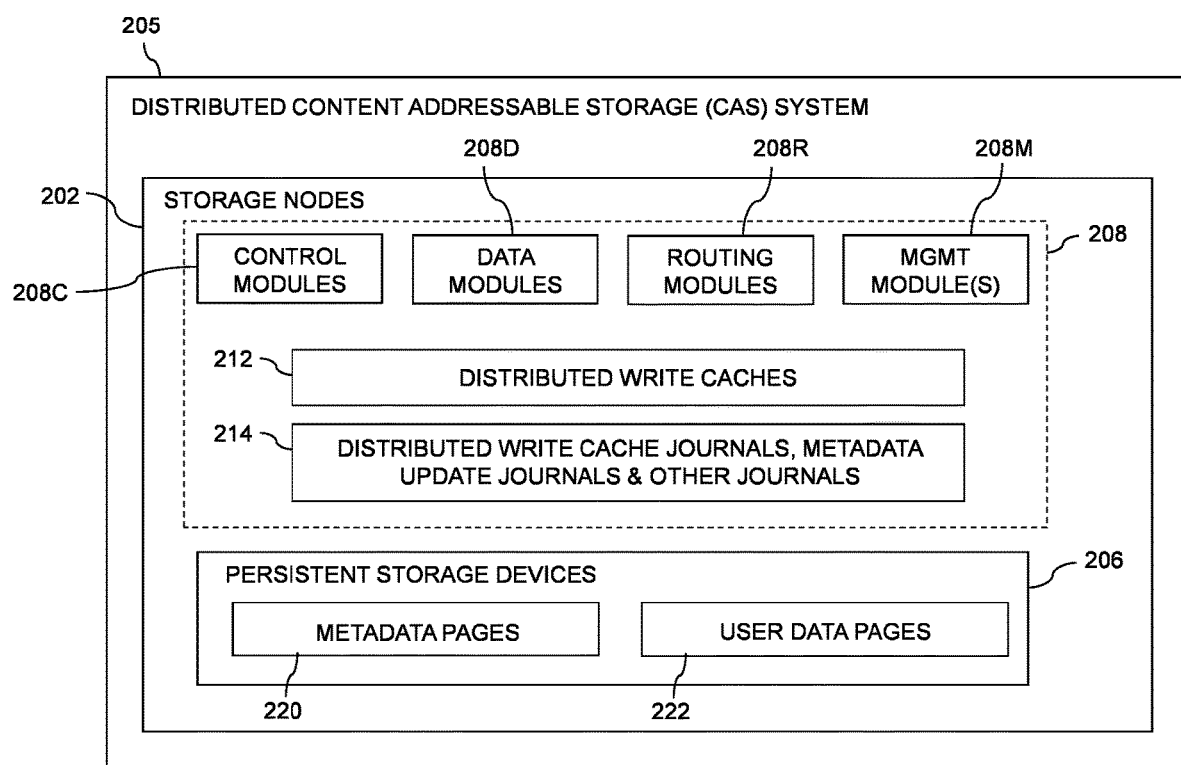
FIG. 2 shows an example of a distributed content addressable storage (CAS) system that illustratively represents one possible implementation of a distributed storage system in some embodiments.

FIG. 2 shows an example of a distributed content addressable storage (CAS) system 205 that illustratively represents a particular example implementation of the distributed storage system comprising the storage nodes 102 of FIG. 1. The distributed CAS system 205 is therefore assumed to be coupled to one or more host devices 101 of a computer system within information processing system 100.

The CAS system 205 comprises a plurality of persistent storage devices 206 and an associated storage controller 208. The storage devices 206 store data of a plurality of storage volumes. The storage volumes illustratively comprise respective LUNs or other types of logical storage volumes. The stored data comprises metadata pages 220 and user data pages 222, both described in more detail elsewhere herein. The storage devices 206 and storage controller 208 are distributed across multiple storage nodes 202. The CAS system 205 can include additional components, such as local and remote interface logic and destaging logic, each also illustratively distributed across the storage nodes 202 of the CAS system 205.

The CAS system 205 is illustratively implemented as a distributed storage system, also referred to herein as a clustered storage system, in which each of at least a subset of the storage nodes 202 comprises a set of processing modules configured to communicate with corresponding sets of processing modules on other ones of the storage nodes 202. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage node 102-1 and the second storage node 102-2 are part of a single content addressable storage system in some embodiments, other types of storage systems can be used for one or both of the first storage node 102-1 and the second storage node 102-2 in other embodiments. For example, it is possible that at least one of the storage nodes 102 in an illustrative embodiment need not be a storage node of a content addressable storage system and such a storage node need not include an ability to generate content-based signatures. In an embodiment of this type, the signature generation functionality can be implemented in a host device.

The storage controller 208 in the present embodiment is configured to implement functionality for, or work in conjunction with the self-tuning resource allocating systems in a distributed storage system of the type previously described in conjunction with FIG. 1.

The storage controller 208 includes distributed write caches 212 and a set of distributed journals 214. The set of distributed journals 214 illustratively comprises a write cache journal, a metadata update journal and possibly one or more other journals. The distributed write caches 212 and the set of distributed journals 214 each illustratively have respective instances thereof on each of the storage nodes 202.

Additional modules that are assumed to be implemented in the storage controller 208 but are not explicitly shown in the figure include, for example, distributed instances of local and remote interface logic 110 and deduplication logic 111, with respective different instances thereof being implemented on respective ones of the storage nodes 202. Each of the storage nodes 202 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 202. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 202. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data ("H2D") table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata ("HMD") table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of or in addition to hash handles in some embodiments.

Again, the logical layer and physical layer mapping tables referred to above are examples only, and can be varied in other embodiments. For example, other types of hash-to-physical ("H2P") mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and RDMA. For example, respective sets of IP links used in data transfer and corresponding messaging could be associated with respective different ones of the routing modules 208R.

In some embodiments, at least portions of the functionality for self-tuning resource allocating systems in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220 and user data pages 222, and one or more of the journals in the set of distributed journals 214, and may also store additional information not explicitly shown such as, for example, one or more system checkpoints and/or snapshots of storage volumes. The metadata pages 220 and the user data pages 222 in some embodiments are illustratively stored in respective designated metadata and user data areas of the storage devices 206. Accordingly, metadata pages 220 and user data pages 222 may be viewed as corresponding to respective designated metadata and user data areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208C and/or elsewhere in the storage nodes 202, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/ 16 =64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 202 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous other arrangements of processing modules of a distributed storage controller may be used to implement self-tuning resource allocating in a distributed CAS system or other type of distributed storage system in other embodiments.

As indicated above, the CAS system 205 illustratively comprises storage nodes 202 interconnected in a mesh network, with each such storage node comprising a set of processing modules configured to communicate with corresponding sets of processing modules on other ones of the storage nodes. A given such set of processing modules comprises at least a routing module, a control module and a data module, with the sets of processing modules of the storage nodes 202 of the CAS system 205 collectively comprising at least a portion of the storage controller 208 of the CAS system 205.

The storage nodes 202 and their respective sets of processing modules are managed by a system manager, illustratively implemented as a management module 208M within the set of processing modules on at least one of the storage nodes 202. Each of the storage nodes 202 illustratively comprises a CPU or other type of processor, a memory, a network interface card (NIC) or other type of network interface, and a subset of the storage devices 206, possibly arranged as part of a DAE of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R module, a C module and a D module, respectively.

These modules are respective processing modules of the storage controller 208, and are potentially located on different ones of the storage nodes 202 of the CAS system 205. For example, each of the storage nodes 202 of the CAS system 205 illustratively comprises at least one R module, at least one C module and at least one D module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 202. The storage node z that implements the D module 208D-z comprises a subset of the storage devices 206 of the CAS system 205, with the subset of storage devices 206 on storage node z being denoted as storage devices 206-z. Each of the other storage nodes 202 of the CAS system 205 similarly has a different subset of the storage devices 206 associated therewith.

The particular features described above in conjunction with FIGS. 1, 2 and 3 should not be construed as limiting in any way, and a wide variety of other distributed implementations of storage nodes 102 or 202 are possible.

Figure 3:
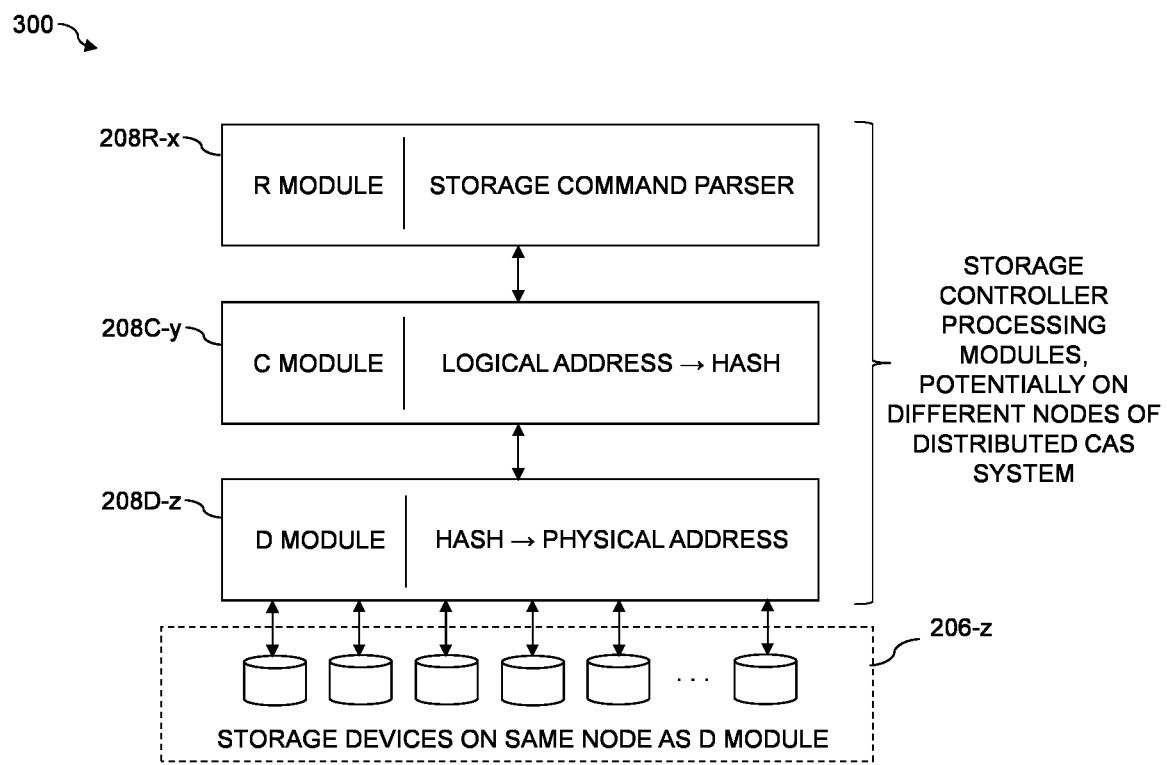
FIG. 3 shows an example relationship between routing, control and data modules of the distributed CAS system of FIG. 2 in an illustrative embodiment.

The particular sets of storage nodes 102 or 202 of the respective example distributed storage systems illustrated in FIGS. 1, 2 and 3 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes may be implemented on respective distinct processing platforms, although numerous other arrangements are possible. At least portions of their associated host devices may be implemented on the same processing platforms as the storage nodes or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of host devices are possible. Similarly, various distributed implementations of CAS system 205 and its storage nodes 202 are possible.

Additional examples of processing platforms utilized to implement storage systems and possibly their associated host devices in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 101, storage nodes 102 or 202, network 104, storage devices 106 or 206, storage controllers 108 or 208, local and remote interface logic 110 and deduplication logic 111 can be used in other embodiments.

It should be understood that the particular sets of modules and other components implemented in a distributed storage system as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments, certain portions of self-tuning resource allocating system functionality as disclosed herein can be implemented in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 4, which implements a process for implementing a self-tuning resource allocating system in a distributed storage system. This process may be viewed as an example algorithm implemented at least in part by the storage controllers 108 of the respective storage nodes 102 of the distributed storage system of FIG. 1. For example, such an algorithm is illustratively carried out at least in part utilizing one or more instances of local and remote interface logic 110 in respective ones of the storage controllers 108. Such an algorithm can also be implemented by the distributed storage controller 208 and its processing modules 208C, 208D, 208R and 208M distributed over the storage nodes 202 of CAS system 205 of FIG. 2. These and other algorithms disclosed herein are more generally applicable to a wide variety of other distributed storage systems each comprising two or more storage nodes.

Figure 4:
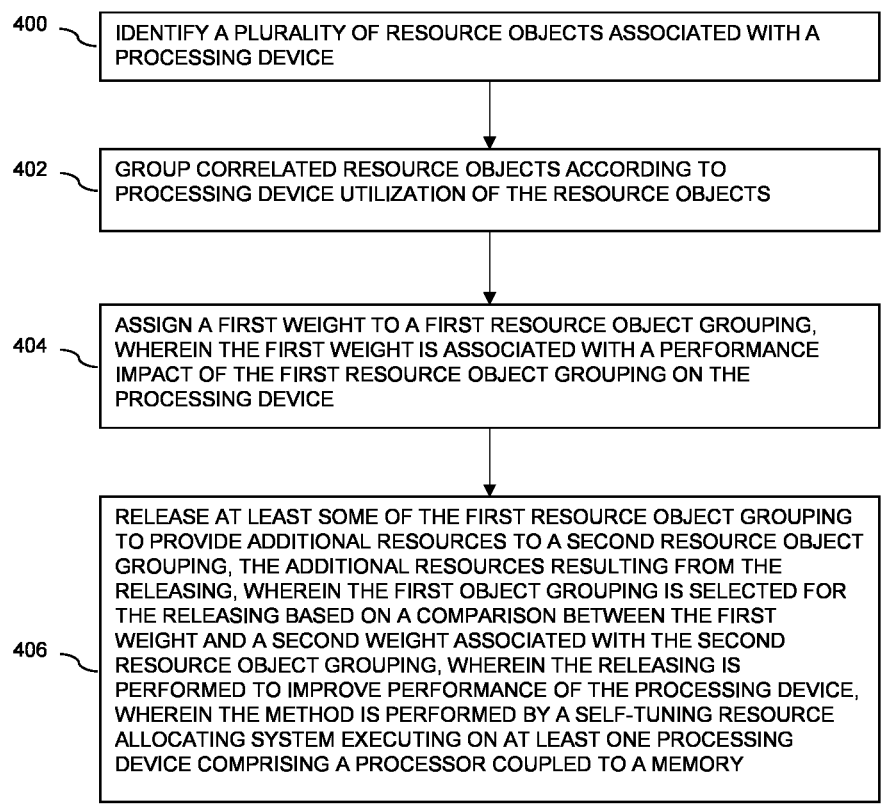
FIG. 4 is a flow diagram of an example process for implementing a self-tuning resource allocating system using a storage devices group in an illustrative embodiment.

Referring now to FIG. 4, at 400, the self-tuning resource allocating system 528 identifies a plurality of resource objects associated with a processing device. For example, the self-tuning resource allocating system 528 may identify resources that impact the performance of the storage system. In an example embodiment, the self-tuning resource allocating system 528 identifies each of the plurality of resource objects using a unique identifier. In some storage systems, resources are tagged with unique identifiers during coding of the resources. In an example embodiment, if there are resource objects that are not tagged with a unique identifier, the self-tuning resource allocating system 528 may tag each of the plurality of resource objects with the unique identifier. In an example embodiment, the self-tuning resource allocating system 528 may identify valuable resources configured in the storage system, such as, but not limited to, IO tracking structures, special purpose memory buffer pools, thread pools, network connections/sockets, and cache buffers, etc.

At 402, the self-tuning resource allocating system 528 groups correlated resource objects according to processing device utilization of the resource objects. In an example embodiment, the self-tuning resource allocating system 528 identifies the resources that may impact the performance of a storage system, such as I/O latency, and clusters those resources together in a resource object group. In an example embodiment, the resource object groups are clustered together according to defined criteria. For example, the self-tuning resource allocating system 528 may analyze operations such as read operations and write operations, and identify which resources become highly utilized ("hot") during those operations. The self-tuning resource allocating system 528 may identify these resources over a period of time. For example, the self-tuning resource allocating system 528 may identify the number of objects versus the total number of objects in any pool based object allocation, such as memory pool. For CPU based resources, the self-tuning resource allocating system 528 may count the number of cycles that are busy versus idle. For bandwidth connections, the self-tuning resource allocating system 528 may count the number of bytes that are transferred in a particular period of time versus the overall bandwidth. The self-tuning resource allocating system 528 may then cluster those resources together because they have a high utilization together for a specific workload. In an example embodiment, static code may be analyzed to identify which resource objects demonstrate similar behavior for a particular storage system workload, or what kinds of objects are allocated within the same code path. The self-tuning resource allocating system 528 may identify objects that demonstrate the similar utilization over a period of time. For example, during synchronous replication, a host I/O is replicated on the remote side. The data is copied and a buffer is allocated to hold the copied data. A replication thread must be allocated to monitor the replication progress. The data is sent over the network to the remote side. There may be network connections or sockets dedicated for synchronous replication. Thus, the thread pool, the data buffer, and the network connections are all going to demonstrate a similar utilization pattern. When synchronous replication is not triggered, these resources may be idle. Thus, the self-tuning resource allocating system 528 may determine that these resources are correlated, and relevant to a particular feature, in this case, synchronous replication. If a read request is transmitted, that request will not trigger these same resources associated with synchronous replication. In other words, there will not be the network connection dedicated for synchronous replication, the buffer for the copied data, nor the thread pool for the synchronous replication. Instead, resources associated with the read request will be allocated.

At 404, the self-tuning resource allocating system 528 assigns a first weight to a first resource object grouping. The first weight is associated with a performance impact of the first resource object grouping on the processing device. In an example embodiment, after the self-tuning resource allocating system 528 groups the critical resources together in resource object groups, the self-tuning resource allocating system 528 calculates a weight for a feature of a storage system. For example, the self-tuning resource allocating system 528 may calculate a weight for a particular performance criterion (such as I/O latency) and/or a particular workload. In an example embodiment, the self-tuning resource allocating system 528 establishes a function to calculate utilization that identifies which subset of resources are highly relevant for a particular performance criterion and a particular workload, and which subset of resources are not highly relevant. In an example embodiment, the critical resources are clustered together to facilitate the utilization calculation. Thus, the self-tuning resource allocating system 528 determines weights for each of the groups of resource objects, and uses the weights to calculate utilization of the groups of resource objects.

In an example embodiment, the self-tuning resource allocating system 528 adjusts at least one weight to align a predicted performance of the processing device with an actual performance. In an example embodiment, the self-tuning resource allocating system 528 comprises a machine learning system. For example, a machine learning system is used to identify which storage system features are relevant (and therefore, which resources are critical to those features). The machine learning system is used to predict the performance of the storage system.

If the predicted performance is not aligned with the actual performance of the storage system, the self-tuning resource allocating system 528 adjusts the weights until the machine learning system can accurately predict the performance of the storage system.

In an example embodiment, the self-tuning resource allocating system 528 calculates a weight for the first resource object grouping using a linear regression function and utilization statistics associated with the first resource object group associated with a sampling period. For example, the self-tuning resource allocating system 528 may define the utilization of each resource group as feature $x_k$, and calculate weight $\theta_k$ of each feature that contributes to the system performance using the linear regression function below, where n is the number of utilization stats collected in sampling periods.

$$h(x) = \theta_0 + \sum_{k=1}^{n} \theta_k x_k$$

In an example embodiment, the self-tuning resource allocating system 528 assigns a weight for each resource object group for at least one performance metric, for example, latency, etc. associated with the performance of the processing device. Thus, if there are multiple performance metrics, for example, Input/output operations per second (IOPs), throughput metrics, and latency, custom defined performance metrics defined by specific applications, etc., the self-tuning resource allocating system 528 may calculate a set of h(x) with different sets of weights calculated for each performance metrics. In an example embodiment, the self-tuning resource allocating system 528 assigns a weight associated with a workload on the processing device and a performance criterion associated with the processing device.

In an example embodiment, the self-tuning resource allocating system 528 assigns a random weight to the first resource object grouping prior to calculating the weight for the first resource object grouping. For example, when initially determining the weight(s) for the resource groups, the self-tuning resource allocating system 528 may randomly assign weights, and then iteratively adjust the weights until the machine learning system can accurately predict the performance of the storage system.

At 406, the self-tuning resource allocating system 528 releases at least some of the first resource object grouping to provide additional resources to a second resource object grouping, where the additional resources result from the releasing. In an example embodiment, the self-tuning resource allocating system 528 determines the performance of the processing devices is less than a preferred performance of the processing device, and in response, releases at least some of the first resource object grouping to improve the performance of the processing device to more closely align with the preferred performance of the processing device. The first object grouping is selected for the releasing based on a comparison between the first weight and a second weight associated with the second resource object grouping, where the releasing is performed to improve performance of the processing device. In an example embodiment, the utilization and/or the weight of the groups of resource objects are used to identify the lowest utilization and/or weights. In an example embodiment, the self-tuning resource allocating system 528 sorts a plurality of resource object grouping weights to identify resource object groups with lower weights as candidates for the releasing. For example, the self-tuning resource allocating system 528 may sort the calculated utilization and/or weights to determine which groups of resources, and therefore, which resources, are the least utilized.

The resource object groupings (identified as the least utilized resources) associated with those utilization and/or weights are selected for releasing to free up a global pool of resources to be available for other components or applications. The self-tuning resource allocating system 528 releases those resources that are not being utilized and redistributes/rebalances the resources to alleviate, for example, latency issues. The resources that are released are, essentially, put to better use, to provide additional resources to critical resources, thus improving the performance of the storage system. In an example embodiment, critical resources may request additional resource allocation from the global pool to improve performance. In other words, a customer may receive a storage system that is pre-allocated to utilize certain features. The self-tuning resource allocating system 528, using a machine learning system, identifies others features that the customer actually uses, and releases resources associated with the pre-allocated features that customer doesn't use to provide more resources for the features the customer does use. Thus, the performance of the storage system is improved according to those features that the customer uses on a daily basis.

In an example embodiment, the self-tuning resource allocating system 528 tunes the performance of the processing device at runtime by iteratively grouping, assigning, and releasing to achieve a preferred performance of the processing device based on at least one of a workload and configuration of the processing device. Thus, the self-tuning resource allocating system 528 continuously improves the prediction of the impact of updated resource allocation and utilization. The self-tuning resource allocating system 528 continuously adjusts resources until the storage system reaches a desired performance with lowest resource allocation and/or highest resource utilization. In an example embodiment, a storage system's configuration may change over time, new features being enabled, some features disabled, or new use cases are applied. The continuous self-tuning resource allocating system 528 allows the storage system to adjust performance metrics with the configuration changes, refine automated performance analysis and estimates accordingly, and dynamically re-distribute resources to achieve a new optimal configuration. For example, as the customer's workload changes, the self-tuning resource allocating system 528 iteratively groups the resources into resource object groups, assigns weights to each resource object group, uses the weights to calculate utilization, and frees up underutilized resources to better balance the resources that are being utilized so as to improve the performance of the storage system. In an example embodiment, the self-tuning resource allocating system 528 continually tunes the storage system, and adjusts as the configuration changes and/or use of the storage system features changes. Thus, if a calculated utilization results in an actual performance that does not align with the predicted performance, the self-tuning resource allocating system 528 may adjust the weights until the predicted performance better aligns with the actual performance of the storage system. In an example embodiment, the self-tuning resource allocating system 528 is a machine learning system that learns the utilization of the storage system according to the customer's use of features and the workload. In another example embodiment, the self-tuning resource allocating system 528 may be disabled and enabled at any time.

In an example embodiment, the self-tuning resource allocating system 528 updates pre-allocated resources to improve the performance of the processing device, where the pre-allocated resources were pre-allocated based on a presumed performance, and where the pre-allocated resources are updated based on an actual performance associated with the processing device. In an example embodiment, storage systems are pre-allocated prior to being sent to customer sites. Performance tuning may be performed, for example, by a manufacturer, according to a typical workload for the majority of use cases (i.e., the presumed performance). In an example embodiment, once the storage system is in use by the customer, the self-tuning resource allocating system 528 dynamically tunes the performance of the processing system and re-allocates the resources according to the actual customer usage of the storage system. Thus, the self-tuning resource allocating system 528 updates the pre-allocated resources to improve the performance of the storage system.

In an example embodiment, the self-tuning resource allocating system 528 provides a template for pre-allocating resources on a second processing device based on the tuning performed for the processing device. For example, the self-tuning resource allocating system 528 may tune a first storage system, creating a template that is used to pre-allocate a second storage system. In another example embodiment, the self-tuning resource allocating system 528 obtains a plurality of pre-allocation templates from a plurality of processing devices, and tailors a pre-allocation template for a third processing device based on commonalities among the plurality of pre-allocation templates. In other words, the self-tuning resource allocating system 528 may collect performance data from a plurality of customers. Through analysis by the self-tuning resource allocating system 528 and the machine learning system, the self-tuning resource allocating system 528 may identify common behaviors regarding workload and usage of features from the performance data from the plurality of customer storage systems. The self-tuning resource allocating system 528 may use this information to more accurately pre-allocate storage systems (i.e., the third processing device) that are tailored to individual customer needs, for example, prior to delivering storage systems to new customer sites.

The self-tuning resource allocating system 528 executes on at least one processing device comprising a processor coupled to a memory. A processing device can comprise at least one processing core of a multi-core storage node of a distributed storage system. In an example embodiment, at least one processing device comprises at least one processing core of a multi-core storage node of a distributed storage system. In an example embodiment, at least one processing device is associated with a distributed content addressable storage (CAS) system.

The steps of the FIG. 4 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 4 is presented by way of illustrative example only, and should not be construed as limiting the scope of the disclosure in any way. Alternative embodiments can use other types of processing operations for implementing self-tuning resource allocating systems 528 in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different self-tuning resource allocating system processes within a distributed storage system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A distributed storage controller as disclosed herein is illustratively configured to implement self-tuning resource allocating system functionality, such as an algorithm comprising a process of the type shown in FIG. 4. Such a distributed storage controller can comprise, for example, storage controllers 108-1 and 108-2 of FIG. 1 or distributed storage controller 208 in CAS system 205, as configured to perform the steps of the process of FIG. 4.

A distributed storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, distributed storage controllers and other system components may be implemented at least in part using processing devices of such processing platforms. For example, respective distributed modules of a distributed storage controller can be implemented in respective containers running on respective ones of the processing devices of a processing platform.

Figure 5:
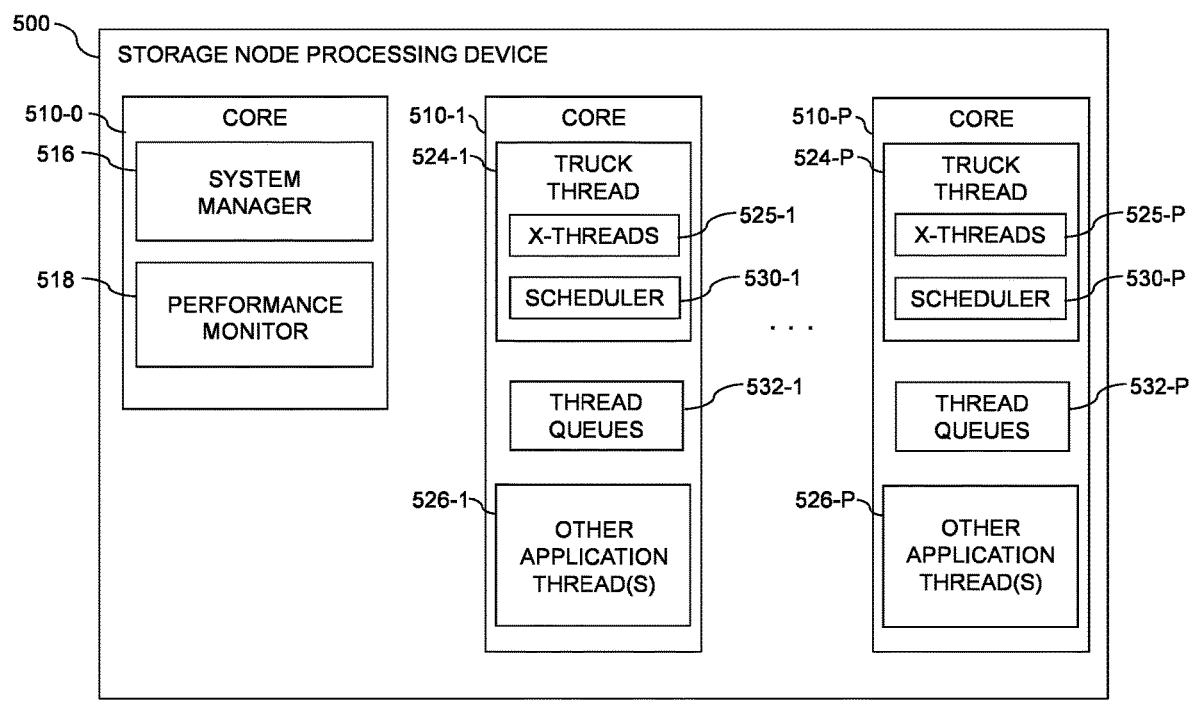
FIG. 5 is a block diagram of a processing device comprising a plurality of processing cores in a distributed storage system implementing a self-tuning resource allocating system in an illustrative embodiment.

Referring now to FIG. 5, an example of a storage node processing device 500 is shown. Such a processing device illustratively comprises at least a portion of a storage node of a distributed storage system, such as one of the storage nodes 102 of FIG. 1. The storage node that includes storage node processing device 500 is part of a distributed storage system implementing self-tuning resource allocating system functionality as disclosed herein.

The processing device 500 in this embodiment comprises a multi-core processor including processing cores 510-0, 510-1, . . . 510-P. The processing core 510-0 implements a system manager 516, a performance monitor 518.

The other processing cores 510-1 through 510-P execute respective truck threads 524-1 through 524-P, comprising respective sets of multiple sub-threads illustratively in the form of X-threads 525-1 through 525-P. Other types of sub-threads can be used in other embodiments. The processing cores 510-1 through 510-P also execute respective sets of one or more other application threads 526-1 through 526-P. These and other threads illustratively comprise operating system (OS) threads of their respective cores 510.

Different ones of the X-threads 525-1 that are in the ready state are illustratively enqueued in one or more of the thread queues 532-1 in order to wait for access to a CPU resource of the processing core 510-1. The thread queues that are used to hold X-threads 525-1 that are in the ready state are also referred to herein as "ready queues." Accordingly, when in the ready state, a given one of the X-threads 525-1 is illustratively queued in a ready queue associated with the scheduler 530-1. Such ready queues are assumed to be part of the thread queues 532-1 of the processing core 510-1. When in the suspended state, the X-thread is illustratively queued in one of the thread queues 532-1, other than one of the ready queues.

For example, in the case of a block-storage application, which handles the block-based storage functionality of the distributed storage system, the block-storage application executes truck threads 524 on respective ones of the cores 510 of the processing device 500. These truck threads 524 implement the block-storage application functionality. In some embodiments, each of the truck threads 524 may be hard affined to a particular one of the processing cores 510, such that it may only execute on that particular core.

The processing cores 510 in some embodiments illustratively comprise respective distinct central processing units (CPUs). Accordingly, each of the storage nodes 102 of the distributed storage system of FIG. 1 may be viewed as comprising a multi-core CPU and an associated storage array comprising a set of storage devices 106, although numerous other arrangements are possible. The storage array or other arrangement of storage devices 106 associated with a given one of the nodes 102 may comprise, for example, a DAE, although such references herein to "disks" should not be construed as an indication that the storage devices are limited to HDDs or other rotating magnetic storage media.

The distributed storage system illustratively receives an IO operation for processing, from one of the host devices 101, and performs what is referred to herein as "end-to-end" processing of the 10 operation using adaptive flow control.

As indicated elsewhere herein, the processing of the IO operation is illustratively distributed across a plurality of distinct storage nodes 102 of the distributed storage system, with each of the storage nodes 102 including a processing device similar to processing device 500 and comprising a corresponding set of processing cores 510 of the distributed storage system. The processing of a given IO operation in the distributed storage system can involve generation of different threads on different ones of the storage nodes 102.

The processing of the IO operation in the distributed storage system can be a very complex process that goes through many steps in multiple ones of storage nodes 102, with each such storage node running many different jobs involving different flows and components, with potentially large numbers of cross-dependencies.

The particular storage node processing device configurations described above in the context of FIG. 5 are only examples, and numerous other processing device configurations can be used in other embodiments.

Figure 6:
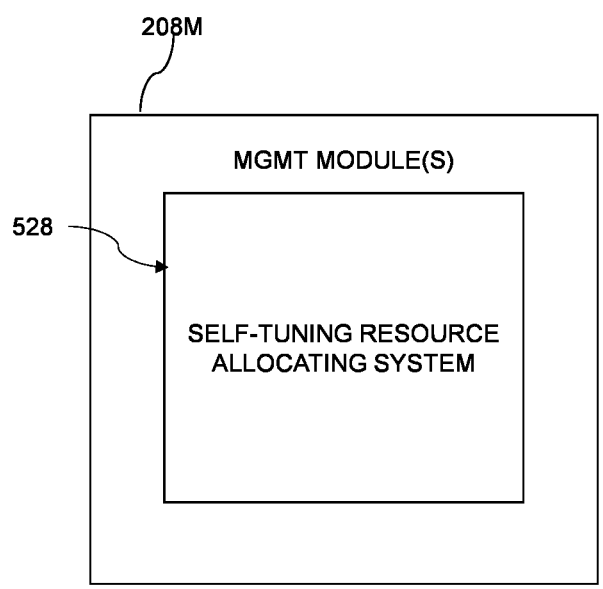
FIG. 6 is a block diagram of a management module in a distributed storage system implementing a self-tuning resource allocating system in an illustrative embodiment.

Referring now to FIG. 6, an example of a management module 208M comprising a self-tuning resource allocating system 528 is shown. The management module 208M is part of a distributed storage system implementing self-tuning resource allocating system functionality as disclosed herein. In an example embodiment, critical resource are allocated by the management module for the routing modules 208R, the control modules 208C, and the data modules 208D. Performance metrics are reported by the routing modules 208R, the control modules 208C, and the data modules 208D. Those performance metrices are gathered and collected by the management modules 208M. In an example embodiment, the self-tuning resource allocating system 528, operating within the management module 208M, analyzes the performance metrics, and the management module 208M communicates to the routing modules 208R, the control modules 208C, and the data modules 208D instructing those modules to adjust their respective resource reservations and resource allocations according the analysis performed by the self-tuning resource allocating system 528. The management module 208M may communicate with each of the modules sitting in the data path. In an example embodiment, the self-tuning resource allocating system 528 may operate outside of the management module 208M. In another example embodiment, the self-tuning resource allocating system 528 may be a standalone plugin that a customer may choose to include within a processing device.

Illustrative embodiments of processing platforms utilized to implement host devices and distributed storage systems with self-tuning resource allocating system functionality will now be described in greater detail with reference to FIGS. 7 and 8. Although described in the context of system 100, these platforms may also be used to implement at least portions of other information processing systems in other embodiments.

Figure 7:
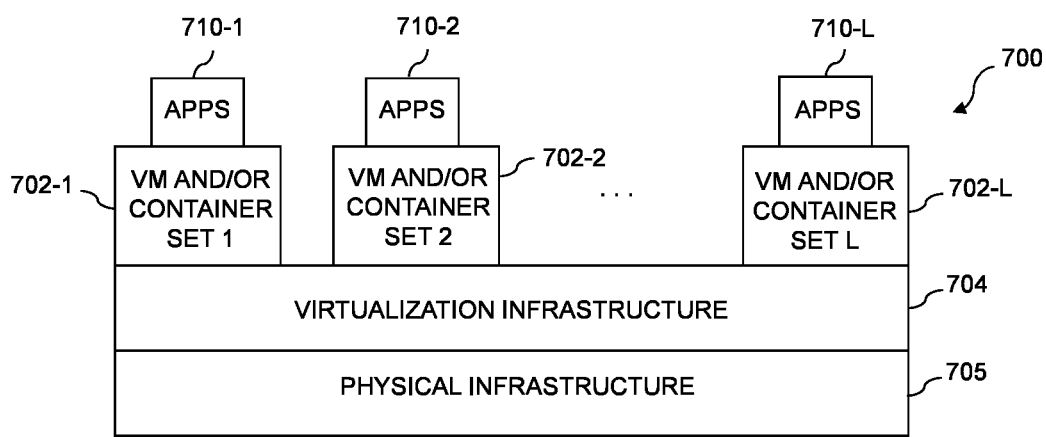
FIGS. 7 and 8 show examples of processing platforms that may be utilized to implement at least a portion of an information processing system in illustrative embodiments.
Figure 8:
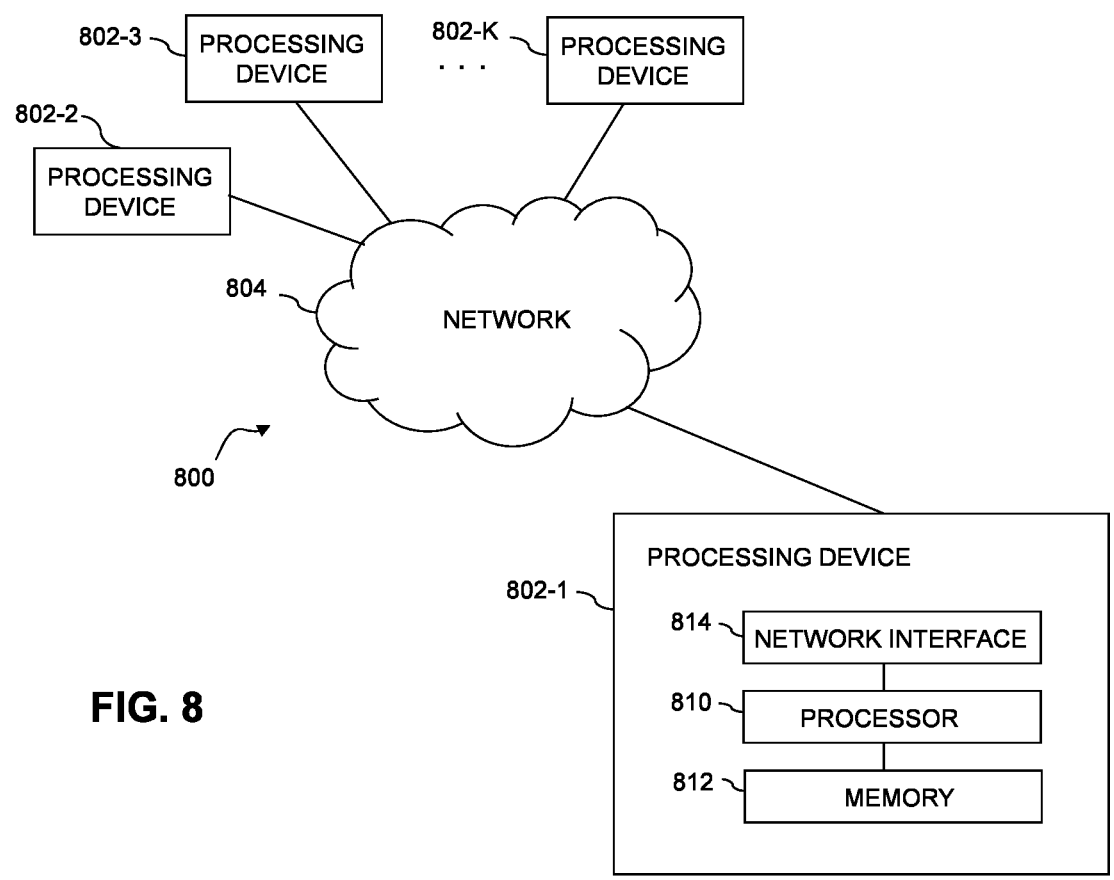

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide self-tuning resource allocating system functionality in a distributed storage system of the type described above using one or more processes running on a given one of the VMs. For example, each of the VMs can implement logic instances and/or other components for implementing functionality associated with self-tuning resource allocating systems 528 in the CAS system 205.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide self-tuning resource allocating system functionality in a distributed storage system of the type described above. For example, a container host device supporting multiple containers of one or more container sets can implement logic instances and/or other components for implementing self-tuning resource allocating system functionality in the CAS system 205.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell Technologies.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the self-tuning resource allocating system functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, local and remote interfaces, deduplication logic, system managers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
identifying a plurality of resource objects associated with a processing device;
grouping correlated resource objects according to processing device utilization of the resource objects;
assigning a first weight to a first resource object grouping, wherein the first weight is associated with a performance impact of the first resource object grouping on the processing device; and
releasing at least some of the first resource object grouping to provide additional resources to a second resource object grouping, the additional resources resulting from the releasing, wherein the first object grouping is selected for the releasing based on a comparison between the first weight and a second weight associated with the second resource object grouping, wherein the releasing is performed to improve performance of the processing device, wherein the method is performed by a self-tuning resource allocating system executing on at least one processing device comprising a processor coupled to a memory.

2. The method of claim 1 further comprising:
tuning the performance of the processing device at runtime by iteratively grouping, assigning, and releasing to achieve a preferred performance of the processing device based on at least one of a workload and configuration of the processing device.

3. The method of claim 2 further comprising:
providing a template for pre-allocating resources on a second processing device based on the tuning performed for the processing device.

4. The method of claim 3 further comprising:
obtaining a plurality of pre-allocation templates from a plurality of processing devices; and
tailoring a pre-allocation template for a third processing device based on commonalities among the plurality of pre-allocation templates.

5. The method of claim 1 further comprising:
adjusting at least one weight to align a predicted performance of the processing device with an actual performance.

6. The method of claim 1 further comprising:
updating pre-allocated resources to improve the performance of the processing device, wherein the pre-allocated resources were pre-allocated based on a presumed performance, and wherein the pre-allocated resources are updated based on an actual performance associated with the processing device.

7. The method of claim 1 wherein identifying the plurality of resource objects associated with the processing device comprises:
identifying each of the plurality of resource objects using a unique identifier.

8. The method of claim 7 wherein identifying each of the plurality of resource objects using a unique identifier comprises:
tagging each of the plurality of resource objects with the unique identifier.

9. The method of claim 1 wherein grouping correlated resource objects according to processing device utilization of the resource objects comprises:
analyzing code associated with operations that execute on the processing device to determine which of the resource objects associated with the process device are correlated.

10. The method of claim 1 wherein grouping correlated resource objects according to processing device utilization of the resource objects comprises:
determining similar resource utilization statistics during a sampling period to determine which of the resource objects associated with the processing device are correlated.

11. The method of claim 1 wherein assigning the first weight to the first resource object grouping comprises:
calculating a weight for the first resource object grouping using a linear regression function and utilization statistics associated with the first resource object group associated with a sampling period.

12. The method of claim 11 further comprising:
assigning a random weight to the first resource object grouping prior to calculating the weight for the first resource object grouping.

13. The method of claim 1 wherein assigning the first weight to the first resource object grouping comprises:
assigning a weight for each resource object group for at least one performance metric associated with the performance of the processing device.

14. The method of claim 1 wherein assigning the first weight to the first resource object grouping comprises:
assigning a weight associated with a workload on the processing device and a performance criterion associated with the processing device.

15. The method of claim 1 wherein releasing the at least some of the first resource object grouping comprises:
determining the performance of the processing devices is less than a preferred performance of the processing device; and
in response, releasing the at least some of the first resource object grouping to improve the performance of the processing device to more closely align with the preferred performance of the processing device.

16. The method of claim 1 wherein releasing the at least some of the first resource object grouping comprises:
sorting a plurality of resource object grouping weights to identify resource object groups with lower weights as candidates for the releasing.

17. The method of claim 1 wherein the at least one processing device comprises at least one processing core of a multi-core storage node of a distributed storage system.

18. The method of claim 1 wherein the at least one processing device is associated with a distributed content addressable storage (CAS) system.

19. An apparatus comprising:
at least one processing device comprising a processor coupled to a memory;
said at least one processing device being configured:
to identify a plurality of resource objects associated with a processing device;
to group correlated resource objects according to processing device utilization of the resource objects;
to assign a first weight to a first resource object grouping, wherein the first weight is associated with a performance impact of the first resource object grouping on the processing device; and
to release at least some of the first resource object grouping to provide additional resources to a second resource object grouping, the additional resources resulting from the releasing, wherein the first object grouping is selected for the releasing based on a comparison between the first weight and a second weight associated with the second resource object grouping, wherein the releasing is performed to improve performance of the processing device.

20. A computer program product comprising a non-transitory processor-readable storage medium having stored therein program code of one or more software programs, wherein the program code when executed by at least one processing device causes said at least one processing device:
to identify a plurality of resource objects associated with a processing device;
to group correlated resource objects according to processing device utilization of the resource objects;
to assign a first weight to a first resource object grouping, wherein the first weight is associated with a performance impact of the first resource object grouping on the processing device; and
to release at least some of the first resource object grouping to provide additional resources to a second resource object grouping, the additional resources resulting from the releasing, wherein the first object grouping is selected for the releasing based on a comparison between the first weight and a second weight associated with the second resource object grouping, wherein the releasing is performed to improve performance of the processing device.

* * * * *